United States Patent [19]

Meyer

[11] 4,270,847
[45] Jun. 2, 1981

[54] ELECTRO-OPTICAL LIGHT MODULATION ELEMENT

[75] Inventor: Herbert Meyer, Quickborn, Fed. Rep. of Germany

[73] Assignee: U.S. Philips Corporation, New York, N.Y.

[21] Appl. No.: 117,180

[22] Filed: Jan. 31, 1980

[30] Foreign Application Priority Data

Feb. 1, 1979 [DE] Fed. Rep. of Germany ....... 2903838

[51] Int. Cl.³ .............................................. G02F 1/03
[52] U.S. Cl. ................................... 350/392; 350/355
[58] Field of Search ............... 350/150, 355, 356, 357, 350/336

[56] References Cited

U.S. PATENT DOCUMENTS

| | | | |
|---|---|---|---|
| 3,709,586 | 1/1973 | Lipp | 350/150 |
| 3,713,723 | 1/1973 | Buchan | 350/150 |
| 3,838,906 | 10/1974 | Kumada | 350/150 |

FOREIGN PATENT DOCUMENTS 2429813  1/1975  Fed. Rep. of Germany .

OTHER PUBLICATIONS

Pepperl, R. "A Solid-State Digital Light Deflector With DKDP Polarization Switches," *Optica Acta* vol. 24, No. 4 (1977) pp. 413-425.

*Primary Examiner*—R. A. Rosenberger
*Attorney, Agent, or Firm*—Marc D. Schechter

[57] ABSTRACT

An electro-optical light modulation element consists of a plate-shaped deuterated potassium dihydrogen phosphate crystal on whose opposite sides transparent layer systems are provided. Each layer system consists of an intermediate layer, on the crystal, comprising an aluminum oxide layer and a silicon oxide layer, a first high-ohmic electrode, on the intermediate layer, which is connected to a second low-ohmic electrode via a transparent cement layer, and a glass layer supporting the second electrode. Such a light modulation element whose optical properties are determined by the longitudinal Pockels effect, may be used advantageously in digital light deflectors.

12 Claims, 2 Drawing Figures

ELECTRO-OPTICAL LIGHT MODULATION ELEMENT

BACKGROUND OF THE INVENTION

The invention relates to an electro-optical light-modulation element consisting of an electro-optical crystal having flat sides which are parallel to one another. Transparent first electrodes are situated on transparent intermediate layers on each side of the element.

In the above-described electro-optical light modulation element the light is phase modulated by using the longitudinal electro-optical effect (Pockels effect). This effect occurs in a monocrystalline plate of a material whose optical axis extends perpendicular to the surface of the plate and which belongs to the potassium hydrogen phosphates family. When such a crystal is placed in an electric field E directed parallel to its optical axis (crystal axis) c, a difference $\Delta n$, between the refractive indices for components, of a light ray travelling in the direction of the optical axis, which are polarized at right angles to each other, is produced. These light components which initially are of equal phase show a phase difference $\phi$ when they leave a crystal of thickness d. Since the effect is linear, $\Delta n$ is proportional to the field E and $\phi$ is proportional to the product E. d. Thus, $\phi$ is proportional to the potential difference V between the input and output faces of the crystal. Accordingly, the polarization of a linearly polarized light beam can be influenced by means of such a crystal. (Optica Acta, Vol. 24, No. 4, pp. 413-425, 1977.)

Light modulation elements of this type can be used, for example, in various systems such as polarization analysis apparatus, electrically controlled light shutters, and apparatus for measuring the thickness and the index of refraction of films.

Such a light modulation element is already known from German Offenlegungsschrift No. 24 29 813. Intermediate layers for insulating the crystal against ambient moisture are present between the flat parallel sides of the electro-optical crystal and the electrodes. The electrodes themselves consist of semitransparent metal films of high electric conductivity, for example gold, silver, and copper, which are placed directly on the intermediate layers. In the case of gold the electrodes are approximately between 5 nm and 16 nm thick. Both the intermediate layers and the electrodes are provided on the crystal by vapor deposition methods.

Although the electrodes have a very high electric conductivity, their transparency is small. Therefore, such light modulation elements are not especially suitable for phase modulation of light beams of low intensity.

For the manufacture of highly conductive and simultaneously highly transparent electrodes it is already known (see German Offenlegungsschrift No. 24 29 813, p. 3, paragraph 2) to provide a transparent conductive film of titanium oxide or indium oxide uniformly on the light surfaces of the electro-optical crystal. For example, in order to obtain such electrodes on the surfaces by vapor deposition, the crystal itself should be heated at a temperature of at least 150° C. for a rather long period of time. However, when an optical crystal, for example, a KDP crystal, is heated (tempered) in such manner, then its electro-optical properties are destroyed.

It has also been suggested to provide highly conductive and highly transparent electrodes, for example of indium oxide, on a substrate of, for example, glass. The high temperatures required for this purpose would not damage the substrate (for example, a flat glass plate). However, in order to contact the electrodes with the crystal, the glass plate should be cemented to the crystal. However, this would not produce a sufficiently homogeneous electric field inside the crystal. Nonuniform field distributions might result at the interfaces between the crystal and the glass as a result of barrier layer formations. Furthermore, nonuniform field distributions might arise by nonuniform conductivity of the crystal or by wedge-shaped cement layers and bubbles in the layers of cement.

SUMMARY OF THE INVENTION

It is therefore an object of the invention to provide an electro-optical light modulation element having a high switching speed with increased transparency and improved homogeneity properties with respect to the electric field inside the light modulation element.

According to the invention this object is achieved by providing a transparent layer of cement on each first electrode of a known light modulation element. The layer of cement is then covered by a second transparent electrode, the conductivity of which is considerably larger than that of the first electrode, for equal transparencies of the electrodes. The second electrodes are each connected to a substrate.

Electro-optical light modulation elements must have a modulation capacity which is as homogeneous as possible throughout their aperture. In other words, light beams which are incident in different places on an input face of the light modulation element and which extend at least substantially parallel to the crystal axis must be phase modulated in the same manner. Furthermore, their electrodes which are in the form of flat thin layers must be as transparent as possible for a given wavelength in order to minimize attenuation of the intensity of the light beam passing through the light modulation element. This is advantageous when the light modulation element is used, for example, in digital light shutters. The requirement for low-ohmic electrodes is a result of the fact that upon switching the light modulation element considerable recharging current flows in said element. This leads to voltage drops and, at high switching frequencies, to heating of the light modulation element.

The first electrodes of the electro-optical light modulation element consist of highly transparent layers of low conductivity which, for example, comprise mainly indium oxide ($In_2O_3$) and which are provided directly on the intermediate layers present on the crystal. Their sheet resistance, however, is comparatively large since the first electrodes can be vapor-deposited only at approximately room temperature.

The sheet resistance of each of the first electrodes is bridged by means of the second electrodes which are each provided on a flat transparent substrate, for example glass. The second electrodes are connected to the first electrodes via a transparent layer of cement. The second electrodes, which are also in the form of thin flat layers also have a high transparency. In contrast to the first electrodes, the second electrode also have a high electrical conductivity. Such electrode layers, which may also consist of indium oxide, are preferably manufactured at high temperatures. By a tempering at a few hundred degrees Celcius however, the conductivity of layers manufactured at room temperature can also be improved.

Thus, during operation and switching of the optical light modulation element the greater part of the displacement current travels through the second electrodes which are capacitively coupled to the first electrodes. The current passing through the first electrodes is substantially only the leakage current which passes in the direction of the crystal axis, perpendicular to the crystal layer. Since these paths are very short, in the first electrodes due to the small layer thicknesses of the first electrodes, the corresponding resistances are also very low. The first electrode now distributes the electric field homogeneously over the crystal and provides charges which slowly flow via the leakage resistance of the crystal. Although small compensating currents parallel to the first electrode result from this, they are negligible compared with those in the second electrode.

In all, these measures produce a light modulation element having a high transparency and electric field homogeneity. Due to the low-ohmic second electrodes, such a modulation element can operate at high switching frequencies without being heated more than normal.

According to an embodiment of the invention the electro-optical crystal is a deuterated potassium dihydrogen phosphate crystal which has a large saturation polarization and a high modulation capacity.

According to another advantageous modified embodiment of the invention the transparent intermediate layer consists of an $Al_2O_3$ layer situated on the surface of the electro-optical crystal and an $SiO_2$ layer present on the $Al_2O_3$.

The intermediate layers are a transparent protective films which are provided directly on the crystal faces. They serve, inter alia, to protect the crystal from ambient moisture when the crystal is sensitive to moisture. However, the intermediate layers also serve as adhering layers for the first electrodes which are provided directly on the intermediate layers, for example by sputtering at room temperature. Furthermore, the intermediate layers also serve to optimize coupling of the electric field in the crystal.

According to a further embodiment of the invention, each of the first electrodes consist substantially of an indium oxide/tin oxide layer provided on the intermediate layers at room temperature. Electrodes having the properties discussed above can advantageously be manufactured from these materials.

According to another embodiment of the invention, each of the second electrodes consist substantially of an indium oxide/tin oxide layer manufactured at high temperatures and provided on a transparent substrate. These layers have a high electrical conductivity and a high optical transparency.

DESCRIPTION OF THE PREFERRED EMBODIMENTS

Figure 1:
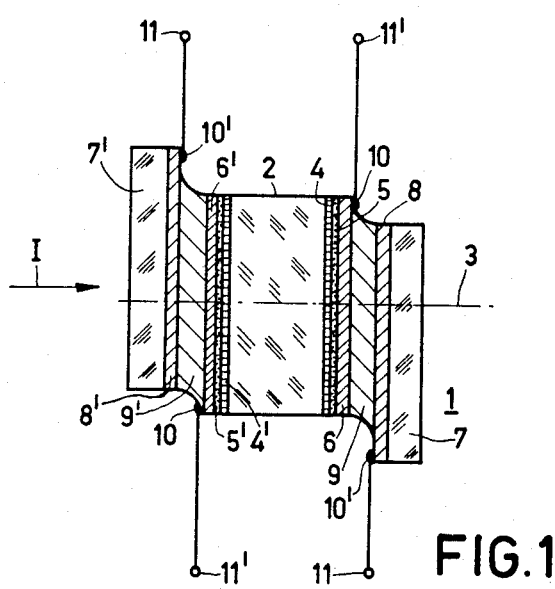
FIG. 1 shows a sectional view of an electro-optical light modulation element according to the invention.

FIG. 1 is a sectional view through an electro-optical light modulation element 1 having an electro-optical crystal 2 which may be, for example, a deuterated potassium dihydrogen phosphate crystal or any other suitable electro-optical crystal. The electro-optical crystal 2 is in the form of a thin flat layer which extends perpendicular to the plane of the drawing and which, for example, has a flat area of approximately 100 $mm^2$ and a thickness of 1 mm. The surface of the layer may be rectangular or circular or may have any other suitable shape. The optical axis 3 of the light modulation element 1 is at right angles to the polished layer surfaces extending parallel to each other. The optical axis is also a crystal axis. Radiation I enters the light modulation element parallel to the optical axis.

The layers 4 and 4', which are approximately 0.1 $\mu m$ thick, consist of transparent aluminium oxide ($Al_2O_3$) films which are provided directly on the crystal 2 by vacuum evaporation or sputtering at substantially room temperature. The silicon dioxide ($SiO_2$) films 5 and 5' are provided in a similar manner on the aluminium oxide films and are approximately 1.0 $\mu m$ thick. Both films 4, 4' and 5, 5' form an intermediate layer and serve both as an insulator for protecting the crystal 2 against ambient moisture and as an adhesive layer for the first electrodes 6, 6' present on the intermediate layers. The thicknesses of the films are matched so that together with the other layers they form a reflection-reducing system.

The first electrodes 6, 6' consist, for example, mainly of indium oxide ($In_2O_3$) and have been provided at room temperature by means of vacuum evaporation or sputtering directly on the intermediate layers (in this case on the silicon dioxide layer 5, 5'). The electro-optical crystal was not heated and hence not damaged. The first electrodes 6, 6' are approximately 0.1 $\mu m$ thick. They have a high sheet resistance, however, their transparency to light in the wavelength range of approximately 633 nm is extraordinarily large. All other layers of the light modulation element also have large transparencies at this wavelength. Of course, the light modulation elements according to the invention may also be constructed for other wavelengths. The thicknesses of the individual films and layers then need only be adapted to the corresponding wavelength.

The first electrodes 6, 6' hence represent together with the electro-optical crystal 2 capacities $C_{kdp}$ of approximately 44 pF with 1 $cm^2$ surface area, the crystal 2 having a dielectric constant $\epsilon$ of approximately $\epsilon = 50$.

Parallel to the first electrodes 6, 6' extend the second electrodes 8, 8' which are provided on flat glass substrates 7, 7' and which are connected to the first electrodes 6, 6' via transparent cement layer 9, 9'.

The second electrodes 8, 8' have a thickness of approximately 0.15 $\mu m$ and also consist mainly of indium oxide ($In_2O_3$). They are provided on the glass substrate 7, 7' at elevated temperature of a few hundred degrees Celcius, for example by vapor deposition, sputtering or deposition from the gaseous phase. The thickness of the glass substrate 7, 7' itself is in the mm range. The second electrodes 8, 8' hence have approximately the same optical transparency as the first electrodes 6, 6'. However, their electrical conductivities are considerably larger.

The cement layers 9, 9' consist, for example, of epoxide resin or polyester resin and have thicknesses of approximately 5 $\mu m$ and dielectric constants of approximately 3. Together with the respective first electrodes 6, 6' and respective second electrodes 8, 8' the layer represent coupling capacities $C_k$ of approximately 530 pF.

It is advantageous to position the first and second electrodes 6, 6' and 8, 8' somewhat displaced parallel to each other so that free surfaces for providing internal connection contacts 10 and outer connection contacts 10' remain at the edges of the corresponding layers.

In addition the outer surfaces of the transparent substrate 7, 7' may be coated with nonreflecting films (not shown) which are manufactured in one or several layers by providing dielectric materials of given indices of refraction at the desired wavelength of the light I.

The electro-optical light modulation element 1 may be operated, for example, between two switching states "0" and "1". The switching state "0" is produced by setting up a voltage U=0 at the outer terminals 11, resulting in, for example, no rotation of the plane of oscillation of a linearly polarized light beam which passes through the light modulation element 1. The second switching state "1" can be produced by applying a positive or negative direct voltage pulse U+ or U— at the outer terminals 11, so that the plane of oscillation of the linearly polarized light beam I is rotated. The value of the direct voltage pulse is approximately between 2 and 4 KV, while the switching frequency may be above 50 KHz. The voltages U+, U— are chosen to be so that they rotate the plane of oscillation of the linearly polarized light beam by the same amount.

Figure 2:
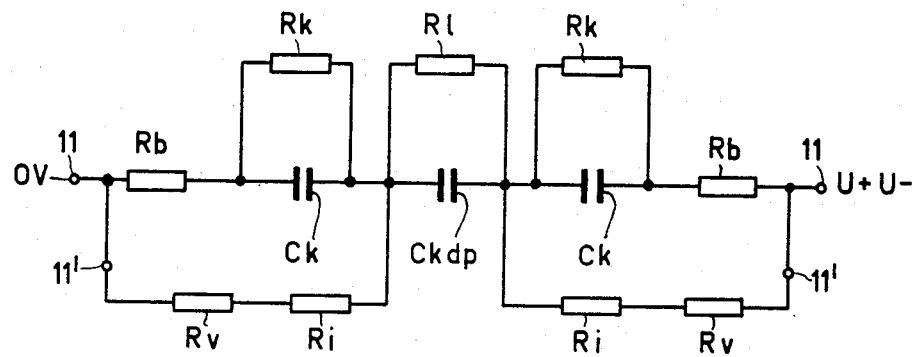
FIG. 2 shows a simple equivalent circuit diagram of the light modulation element.

FIG. 2 shows a simplified equivalent circuit diagram of the electro-optical light-modulation element shown in FIG. 1. The capacity $C_{kdp}$ represents the capacity of the electro-optical crystal 2 whose leakage resistor $R_L$ is parallel to $C_{kdp}$. Electrically in series herewith are the parallel circuits of the coupling capacity $C_k$ and its leakage resistor $R_k$ which represents the resistance of the cement layer 9 or 9'. The voltage drop at the coupling capacity $C_k$ should be as small as possible.

In series with these parallel circuits $C_k$ and $R_k$ are the resistances $R_b$ of the low-ohmic second electrodes 8 and 8', respectively, at the end of which the connections 11 are present. Parallel to the series arrangements of the resistor $R_b$ of the second electrodes 8, 8' and the parallel circuit of $C_k$ and $R_k$ are the series arrangements of the resistances Ri and the first electrodes 6 and 6', respectively, and the variable resistors Rv. The first and second electrodes 6, 8 and 6', 8', respectively, each present on one side of the light modulation element 1, are thus at the same terminal of the voltage source U (voltage source U not shown).

When, for example, a rectangular voltage pulse is applied to the connections 11 of the system of FIG. 2, the first electrodes 6, 6' assume potentials which result from the capacitive voltage division ratio of $C_{kdp}$ and $C_k$ and the ohmic resistances which, in general, produce some pulse tilt of the voltage pulse at the crystal 2. Pulse tilt is the distortion of the rectangular input into a "triangular" form.

In the simplest case the first electrodes 6, 6' are not connected to the voltage source (Rv= ∞). The voltage variation in time at the crystal 2 is then determined by its time constant and by that of the cement layers 9, 9'. If possible, both time constants ($R_k C_k$ and $R_l C_{kdp}$, respectively), should be equal since in that case no pulse tilt of the optically active voltage pulse at the crystal 2 will result from Rk or Rl. If the connection to the first electrodes 6, 6' is omitted, voltage pulse having a smaller width should be used since in this case the inclination of the pulse tilt has reduced influence on the optical modulation properties of the light modulation element 1.

The first electrodes 6, 6' and the second electrodes 8, 8' may also be connected together electrically. The series variable resistors Rv are then adjusted to assure that little or no pulse tilt of the voltage pulse at the crystal 2 is produced so that the first electrodes 6, 6' assume a defined potential as soon as possible.

In the embodiment shown, with an input pulse of U=4 KV, the voltage drop across the coupling capacitors Ck is 14.5% of the electric input pulse. The optically active voltage pulse at the crystal 2 is reduced by this amount. As a result, 95% of the incident linearly polarized light for a 1 mm thick crystal 2 is modulated. With a crystal thickness of 4 mm, the modulation is improved to 99.6% of the incident light.

What is claimed is:

1. An electro-optical light modulation element comprising:
    an electro-optical crystal having at least two flat sides, said sides being substantially parallel to each other;
    two intermediate layers, each layer being transparent to the light to be modulated, one layer being provided on each flat side; and
    two first electrodes, each electrode being transparent to the light to be modulated, one such electrode being disposed on each transparent intermediate layer;
    characterized in that the element further comprises:
    two layers of cement, each layer of cement being transparent to the light to be modulated, one cement layer being provided on each first electrode; and
    two second electrodes, each second electrode being transparent to the light to be modulated, one second electrode being provided on each cement layer, each of said second electrodes having an electrical conductivity which is greater than that of each of the first electrodes for equal transparencies of the electrodes.

2. An electro-optical light modulation element as claimed in claim 1, characterized in that the second electrodes are each connected to a substrate.

3. An electro-optical light modulation element as claimed in claim 2, characterized in that the electro-optical crystal is a deuterated potassium dihydrogen phosphate crystal.

4. An electro-optical light modulation element as claimed in claim 3, characterized in that each transparent intermediate layer consists of an $Al_2O_3$ layer provided on a side of the electro-optical crystal and an $SiO_2$ layer provided on said $Al_2O_3$ layer.

5. An electro-optical layer as claimed in claim 4, characterized in that the first electrodes comprise indium oxide provided on the intermediate layers at room temperature.

6. An electro-optical light modulation element as claimed in claim 5, characterized in that the first electrodes further comprise tin oxide.

7. An electro-optical light modulation element as claimed in claim 6, characterized in that the second electrodes comprise indium oxide provided on a transparent substrate at high temperature.

8. An electro-optical light modulation element as claimed in claim 7, characterized in that the second electrodes further comprise tin oxide.

9. An electro-optical light modulation element as claimed in claim 8, characterized in that the transparent cement layers comprise a transparent adhesive.

10. An electro-optical light modulation element as claimed in claim 9, characterized in that the transparent adhesive comprises an epoxide resin or a polyester resin.

11. An electro-optical light modulation element as claimed in claim 10, characterized in that the time constant of the transparent cement layer is less than or equal to the time constant of the electro-optical crystal.

12. A electro-optical light modulation element as claimed in claim 11, characterized in that the first electrode and the second electrode on one side of the electro-optical crystal are electrically connected to each other and the first electrode and the second electrode on the other side of the electro-optical crystal are electrically connected to each other.

* * * * *